I. S. BERGER.
TOOTH SHADE GUIDE.
APPLICATION FILED APR. 29, 1919.

1,327,306.

Patented Jan. 6, 1920.

INVENTOR
Isidore S. Berger
BY Jas. H. Griffin
ATTORNEY

UNITED STATES PATENT OFFICE.

ISIDORE S. BERGER, OF NEW YORK, N. Y.

TOOTH-SHADE GUIDE.

1,327,306.  Specification of Letters Patent.   Patented Jan. 6, 1920.

Application filed April 29, 1919. Serial No. 293,516.

*To all whom it may concern:*

Be it known that I, ISIDORE S. BERGER, a citizen of the United States, residing in the city of New York, borough of Bronx, county of Bronx, and State of New York, have invented a certain new and useful Tooth-Shade Guide, of which the following is a specification.

This invention is a tooth shade guide, and the object of the invention is to enable a dentist to select artificial teeth which exactly match in shade the natural teeth of the individual in whose mouth the artificial teeth are to be inserted. The invention is applicable to all artificial teeth, or facings, which require a gold backing in order to attach them to their abutments, whether crowns or inlays, or to adjacent artificial teeth. The invention is based on a recognition and practical application of the fact that artificial teeth, composed of as they are of translucent porcelain very materially change in shade or color when backed with gold, due to interference with the normal transmission of light through the teeth.

The procedure of selecting the shade of artificial teeth heretofore has been to compare the sample tooth with the patient's teeth and then select from stock a tooth having a shade corresponding with the number on the shade guide tooth. Now this shade, while correct before backing and soldering the tooth or teeth, became distinctly different after the denture was completed and ready to be inserted on account of the gold backing rendering the teeth more opaque and yellow.

However, frequently, when substituting a tooth corresponding in number to the one of the shade guide the proper shade is not obtained, due to the fact that shades of the shade guide teeth and the stock teeth vary on account of the shade guide teeth, being mounted on a steel, nickel plated arm, are rendered somewhat bluish when resting against the arm, unless the tooth is turned at right angles to the arm in which case this difficulty is overcome.

The accompanying drawings illustrate practical embodiments of the invention, but the structures shown therein are to be regarded as illustrative, only, and not as being exclusive of the various forms in which the invention may be given embodiment.

Figure 1:
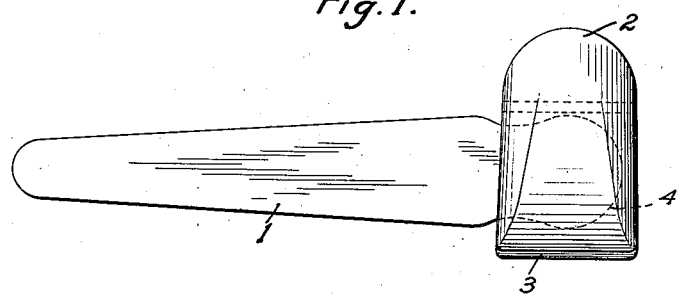
Figure 1 is a front view of the complete device, namely, a handle or support, the guide-tooth and intermediate backing.

Referring to the drawings, and particularly to Figs. 1 to 7 inclusive, 1 designates an arm or support, 2 a guide tooth, and 3 the intermediate gold backing. The arm 1 is provided with a head 4 to which the tooth 2 and the backing 3 are attached. For this purpose, any suitable, readily attaching means may be employed but, for purposes of illustration, I have shown a ball and socket fastener the male member thereof 5, being in the form of a pin provided with a head projecting from the back of the tooth, and the cooperating female member or socket 6 being positioned centrally of the head 4 and the handle 1, thereby enabling the handle to be readily attached or detached from the tooth. When the gold or gold-plated backing 3 is employed, it is provided with an aperture 7, through which the pin 5 extends and projects beyond the face thereof to such extent as to enable the head of the pin 5 to take into the socket 6, and to be held therein, as usual, by spring action.

Figure 2:
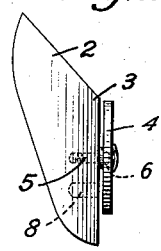
Fig. 2 is an end view of the construction shown in Fig. 1 looking in the direction of the arrow applied to said figure.
Figure 3:
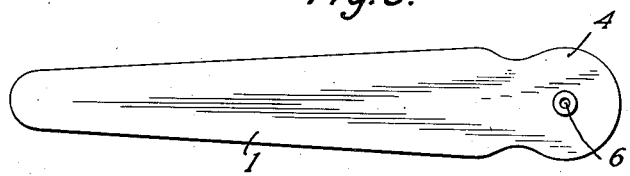
Fig. 3 shows the handle or support detached.
Figure 4:
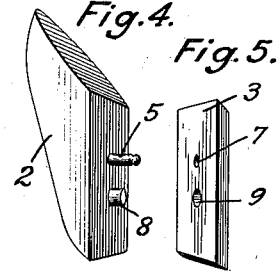
Fig. 4 shows, in perspective, a guide tooth detached, with two pins projecting from the back thereof.
Figure 5:
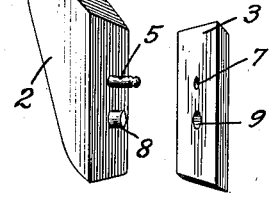
Fig. 5 shows, in perspective, the gold or gold-plated metal plate or backing employed between the handle and the tooth.
Figure 6:
Fig. 6 is the same as Fig. 1, but showing the tooth extending lengthwise of the handle or support.
Figure 7:
Fig. 7 is a side view of the device, shown in Fig. 6.

In order to secure the backing and tooth against relative movement, the back of the tooth is provided with a projecting pin or stud 8 adapted to enter a socket 9 in the backing 3, thereby preventing rotation of the backing on its attaching pin 5. Pin 8 has a projecting length equal in thickness to that of backing 3, whereby its outer end is flush with that surface of the backing 3 opposing tooth 2, as shown in Fig. 2.

Figure 8:
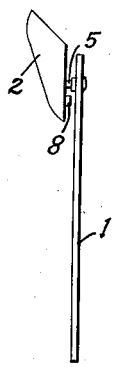
Fig. 8 is a side view of the device with the gold or gold-plated metal plate or backing omitted for use particularly in connection with teeth for rubber plates or porcelain pivots wherein no backing is employed.

In the construction shown in Fig. 8, the gold backing 3 is dispensed with, thereby enabling the device to be used in matching teeth in connection with which no gold backing is employed, such as teeth for rubber plates or porcelain pivots.

Figure 9:
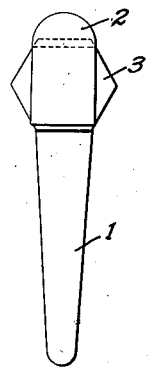
Fig. 9 is substantially the same as the device shown in Fig. 7 except that the tooth has only a single pin, there being no intermediate backing, but instead the head of the handle is gold-plated and made into the shape of a hexagon; and, Fig. 10 is the same as Fig. 9 except that the head of the handle is circular in shape.

Referring to Fig. 9, the head of the handle is shown as having a hexagonal shape, thereby enabling tooth 2 to be rotated in any one of 6 positions relative to handle 1 and still retain the gold or gold-plated metal backing in proper position.

Figure 10:
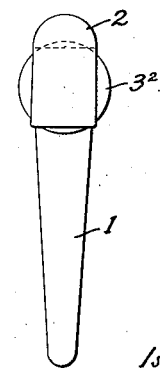

Fig. 10 shows substantially the same construction as that of Fig. 9 with the exception that the head of the handle is made circular in shape, so that, regardless of the position to which the tooth is rotated, it still has a gold or gold-plated metal backing behind it.

From the foregoing description, the operation of the device will be readily understood, but it may be referred to briefly as follows. The guide-tooth having been mounted on the handle or support with the gold or gold-plated metal backing occupying its intermediate position, all that is necessary is merely to place the tooth adjacent to the one which it is desired to match, thus obtaining the desired result, and properly and correctly matching the shade of the soldered tooth. In matching teeth which are not fitted with a gold or gold-plated metal backing, the gold or gold-plated metal backing may be readily removed from the device, whereupon the stem is used in the same manner as before described. This feature of structure is illustrated in Fig. 8.

The face of the head, adjacent the back face of the tooth might be gold plated as shown in Figs. 9 and 10, thereby dispensing with the separate detachable gold plated backing.

It will be understood that minor changes may be made in the construction described, such as the employment of equivalents or the reversal of parts, without departing from the spirit and substance of the invention, the scope of which is commensurate with the amended claims.

I further wish it understood that the parts referred to as formed of gold may be formed of other material, gold plated, or vice versa, as gold plate is much less expensive than the solid metal.

Having thus fully described the invention, what I claim as new, and desire to secure by Letters Patent is:

1. A tooth shade guide embodying a tooth, an arm to which the tooth may be attached and a gold metal surface between the tooth and the arm forming a backing for the tooth.

2. A tooth shade guide embodying an arm, a detachable tooth, a detachable gold backing for the tooth, and means for securing said backing to the back of the tooth.

3. In a tooth shade guide, a tooth provided at its back with two pins, a gold backing having apertures adapted to register with said pins and an arm adapted to be detachably secured to one of said pins.

4. A tooth shade guide embodying a tooth provided with a guide backing, an arm for manipulating said tooth, and means for detachably rotatably mounting the tooth and its backing on the arm.

5. A tooth shade guide embodying a tooth, a gold backing on said tooth and detachably secured thereto, an arm for manipulating the tooth and backing as a unit, and means for rotatably mounting the tooth and backing as a unit on the arm.

In testimony whereof I have signed my name to this specification.

ISIDORE S. BERGER.